July 23, 1957  A. J. GRANBERG  2,800,022
LIQUID METER ASSEMBLY

Filed June 1, 1954  2 Sheets-Sheet 2

INVENTOR.
ALBERT J. GRANBERG
BY
Bruce + Brosler
HIS ATTORNEYS

United States Patent Office 2,800,022
Patented July 23, 1957

2,800,022
LIQUID METER ASSEMBLY

Albert J. Granberg, Oakland, Calif.

Application June 1, 1954, Serial No. 433,513

1 Claim. (Cl. 73—231)

My invention relates to the dispensing of liquid and more particularly to a meter for measuring of liquid which is being dispensed.

The invention is of particular significance in the filling of fuel tanks of vehicles such as air craft where it is quite important that a fueling operation be maintained even though the meter itself should, for some reason, fail.

Among the objects of my invention are:
1. To provide a novel and improved liquid meter assembly;
2. To provide a novel and improved liquid meter assembly of relatively simple and rugged construction;
3. To provide a novel and improved liquid meter assembly which will pass liquid even should the meter itself fail to function and remain static under the pressure of liquid flow.

Additional objects of my invention will be brought out in the following description of a preferred embodiment of the same, taken in conjunction with the accompanying drawings, wherein.

Figure 1:
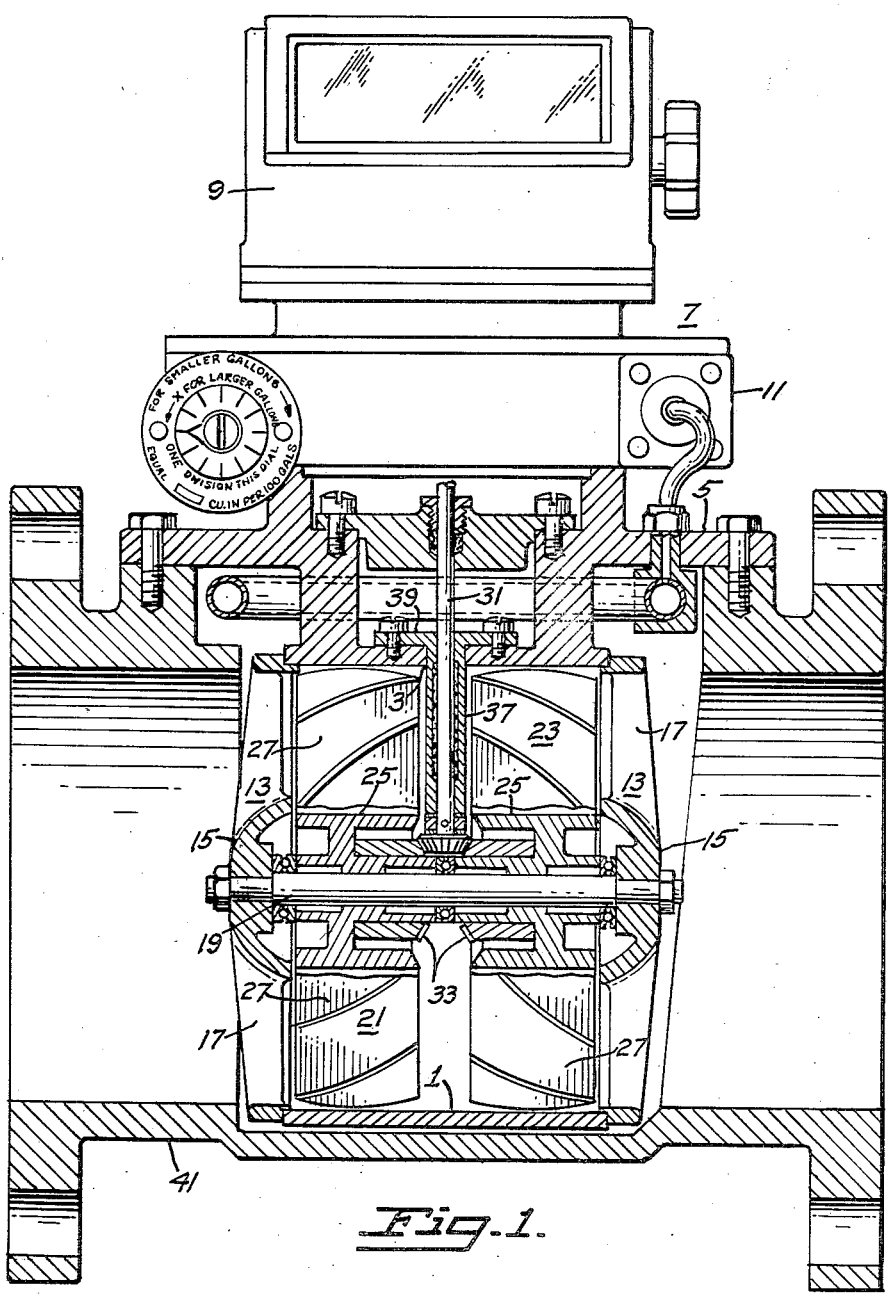
Figure 1 is a view in section of a meter embodying the feature of the present invention.
Figure 2:
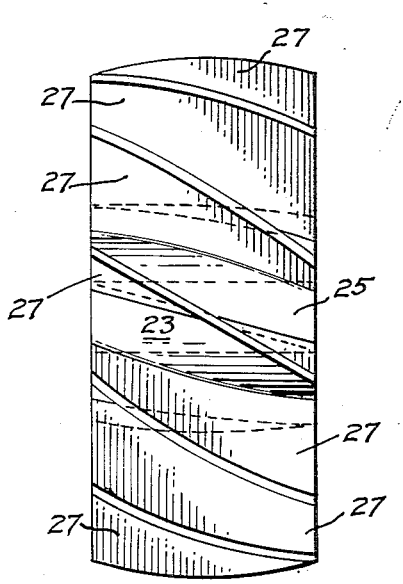
Figure 2 is a front elevational view of a rotor of such meter.
Figure 3:
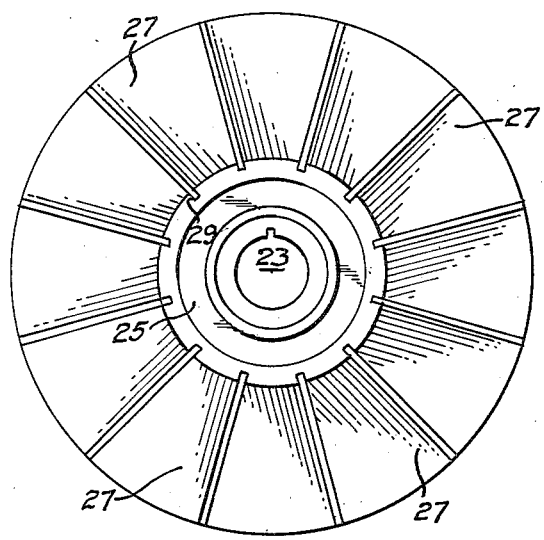
Figure 3 is an end elevational view of the same rotor.
Figure 4:
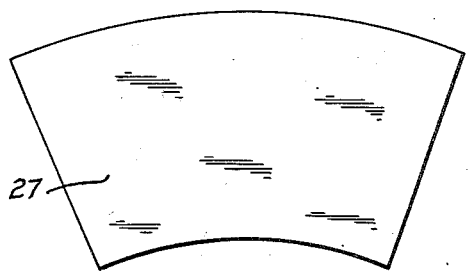
Figure 4 is a view depicting the general shape of a blade of such rotor.

Referring to the drawings for details of my invention in its preferred form, the meter comprises a cylindrical rotor housing 1 having a hole 3 intermediate the ends thereof and a flange 5 surrounding such hole, on which to mount indicating mechanism 7 such as a counter 9 or the like, which may include in conjunction therewith a temperature compensating coupling assembly 11 disposed intermediate the rotor housing and the counter. Such temperature compensating coupling is illustrated and described in a copending application of mine for Temperature Compensating Coupling Assembly for Liquid Meters, Serial No. 428,711, filed May 10, 1954.

Within the housing there is disposed a dual rotor assembly including a spider 13 at each end of the housing in the form of a hub 15 and arms 17 radiating therefrom, a shaft 19 supported by these spiders along substantially the longitudinal axis of the housing, and a pair of rotors 21, 23 rotatably mounted on this shaft.

Each of the aforementioned rotors includes a rotor hub 25 and a plurality of vane type blades 27 uniformly spaced about the rotor hub and anchored thereto in slots 29 provided in the surface of the rotor hub, with each blade at an angle to the longitudinal axis of the hub and of a length to substantially span the distance between the lagging end of the blade ahead and the leading end of the blade behind, as viewed from an end of such rotor. Liquid flowing into such a rotor will cause rotation thereof on its supporting shaft, due to the angular disposition of the blades.

The two rotors differ in the one respect, namely, that the blades of one are reversed with respect to the blades of the other, in order to produce rotation in opposite directions in response to liquid flowing longitudinally through the meter housing.

Such rotational movement of both rotors is transformed into rotation of a common meter shaft 31 which in turn is coupled through the temperature compensating coupling assembly to the counter, to record in the counter, the quantum of liquid flowing through the meter.

To accomplish this objective, each of the rotors has at its inner end, a bevel gear 33, each of which is in mesh with a miter gear 35 at the lower end of the meter shaft. The shaft is journalled in a bearing sleeve 37 which extends down through the hole in the housing, such sleeve having a mounting flange 39 at its exposed end for supporting the sleeve from such housing.

The rotor housing and its included rotor assembly, is suspended by the rotor housing flange, in a meter casing which may take the form of a flanged pipe section 41 adapted to be coupled into a pipe line, whereby the liquid flow in such pipe line will be directed through the rotors longitudinally of the rotor housing, to record the liquid flow on the counter mounted above.

The meter thus functions due to impact of the liquid against the blades, and inasmuch as the reverse rotation of one rotor with respect to the other will naturally compensate for any lateral displacement of liquid in its passage through the first rotor, the liquid will pass completely through the meter with essentially no turbulence, thereby eliminating factors which might otherwise introduce errors into the meter meadings.

It is important to note further, that the passage through the meter is open at all times, that that should the meter for any reason, break down or fail to function, the liquid would still be free to flow through the line and the filling operation will thereby continue.

It will be apparent from the foregoing description of my invention in its preferred form, that the same fulfills the objects of invention attributable thereto, and while I have limited my specific disclosure to a preferred embodiment of the invention, the same is subject to alteration and modification without departing from the fundamental principles involved, and I accordingly do not desire to be limited in my protection to such details as I have illustrated and described except as may be necessitated by the appended claim.

I claim:

A liquid meter comprising a cylindrical rotor housing having a hole intermediate the ends thereof and a flange surrounding said hole on which to mount indicating mechanism, a rotor assembly in said housing, said rotor assembly including a spider at each end of said housing involving a hub and arms radiating therefrom, a shaft supported by said spiders along substantially the longitudinal axis of said housing, a plurality of rotors rotatably mounted on said shaft, each of said rotors including a rotor hub and a plurality of vane type blades uniformly spaced about said rotor hub and anchored thereto with each blade at an angle to the longitudinal axis of said hub and of a length to substantially span the distance between the lagging end of the blade ahead and the leading end of the blade behind as viewed from an end of such rotor, a bearing sleeve extending through said housing hole, said bearing sleeve having means at its exposed end for supporting said sleeve from said housing, a shaft journalled in said sleeve, means coupling said shaft to said rotors, indicating mechanism mounted on said flange, and means coupling said bearing sleeve shaft to said indicating mechanism, said rotor assembly and indicating means constituting a unit assembly capable of being supported solely by said flange.

References Cited in the file of this patent

UNITED STATES PATENTS

| | | |
|---|---|---|
| 739,269 | Tilden | Sept. 15, 1903 |
| 990,208 | Lohse | Apr. 18, 1911 |
| 1,025,633 | Lohse | May 7, 1912 |
| 1,040,537 | Havard | Oct. 8, 1912 |
| 2,245,759 | Chrisman | June 17, 1941 |

FOREIGN PATENTS

| | | |
|---|---|---|
| 14,060 | Great Britain | 1852 |
| 841,952 | Germany | June 23, 1952 |